United States Patent
Nakagawa

[11] 3,994,574
[45] Nov. 30, 1976

[54] WIDE-ANGLE PHOTOGRAPHIC LENS SYSTEM

[75] Inventor: Jihei Nakagawa, Higashimurayama, Japan

[73] Assignee: Olympus Optical Co., Ltd., Tokyo, Japan

[22] Filed: Oct. 1, 1975

[21] Appl. No.: 618,672

Related U.S. Application Data

[63] Continuation-in-part of Ser. No. 452,444, March 18, 1974, abandoned.

[30] Foreign Application Priority Data

Mar. 19, 1973 Japan.............................. 48-31704

[52] U.S. Cl................................ 350/214; 350/176
[51] Int. Cl.²........................................... G02B 9/64
[58] Field of Search........................... 350/214, 176

[56] References Cited
UNITED STATES PATENTS

| | | |
|---|---|---|
| 3,135,818 | 6/1964 | Turula et al. .................. 350/214 |
| 3,645,605 | 2/1972 | Nakagawa...................... 350/214 |
| 3,830,559 | 8/1974 | Matsubara ..................... 350/214 |
| 3,832,037 | 8/1974 | Nakagawa...................... 350/214 |
| 3,862,794 | 1/1975 | Fuji................................... 350/214 |

*Primary Examiner*—John K. Corbin
*Assistant Examiner*—Conrad Clark
*Attorney, Agent, or Firm*—Cushman, Darby & Cushman

[57] ABSTRACT

A compact wide-angle photographic lens system for which the total focal length of the front lens group is made a negative value and for which low-dispersion glass is used for the positive first lens component and high-dispersion glass is used for the negative second lens component in said front lens group in order to favorably correct various aberration, especially chromatic aberration.

6 Claims, 10 Drawing Figures

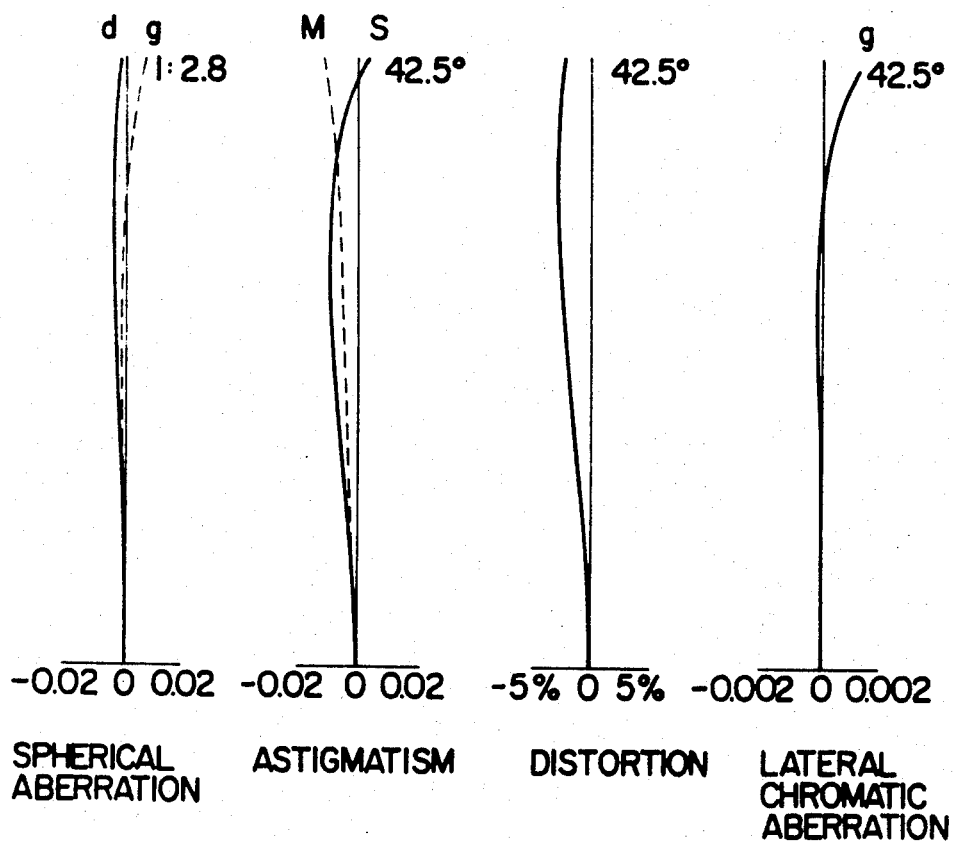

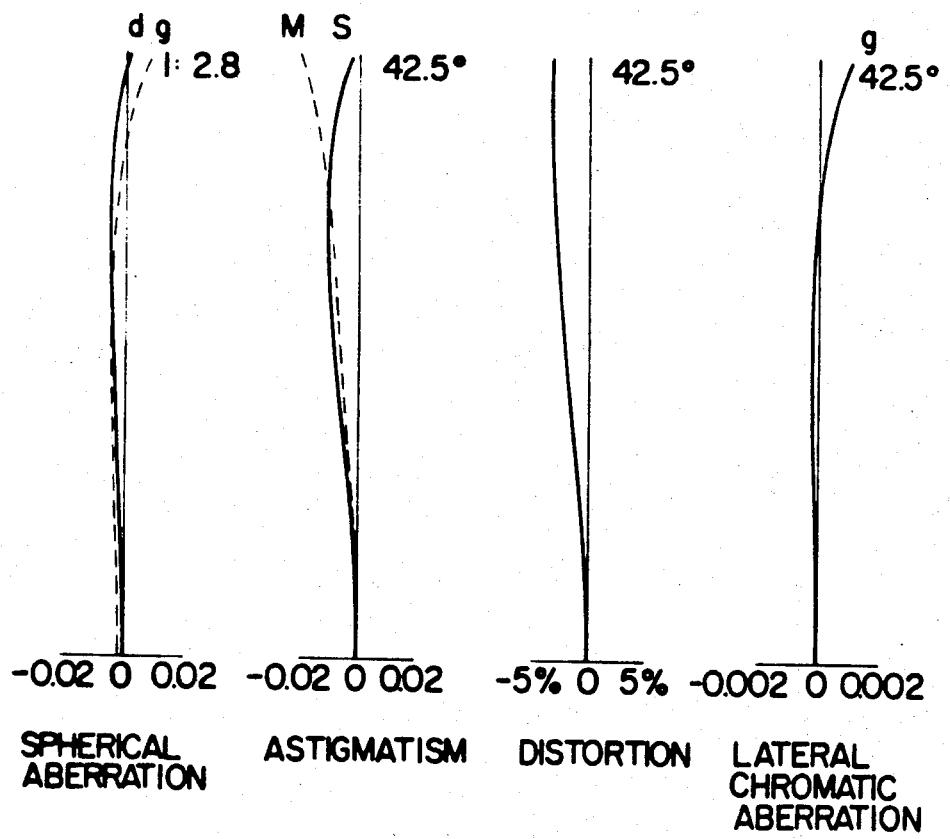

WIDE-ANGLE PHOTOGRAPHIC LENS SYSTEM

This application is a continuation-in-part of application Ser. No. 452,444, filed Mar. 18, 1974, now abandoned.

BACKGROUND OF THE INVENTION a. Field of the Invention

The present invention relates to a wide-angle photographic lens system and, more particularly, to a compact wide-angle photographic lens system for which aberrations are corrected extremely favourably and which is characterized in the correcting means especially of lateral chromatic aberration out of correcting means of various aberrations.

b. Description of the Prior Art

For retrofocus type wide-angle lenses which are used as wide-angle photographic lenses at present, high-dispersion glass is used for positive lenses in the front lens group and low-dispersion glass is used for negative lenses in said front lens group in order to correct lateral chromatic aberration. This is based on the thought that, if diverging colour dispersion caused in the front lens group is too large, it is impossible to correct it by the rear lens group.

SUMMARY OF THE INVENTION

It is the object of the present invention to provide a wide-angle photographic lens system which is arranged by using low-dispersion glass for the first lens component and high-dispersion glass for the second lens component, that is, by using low-dispersion glass for the positive lens and high-dispersion glass for the negative lens and for which chromatic aberration is corrected very favourably by adopting a correcting means for lateral chromatic aberration which is quite different from the correcting means for this type of retrofocus type wide-angle lenses.

The lens system according to the present invention is arranged by seven lens components comprising eight lens elements. Out of them, the first lens component is a positive meniscus lens, second and third lens components are both negative meniscus lenses, fourth lens component is a positive lens, fifth lens component is a negative cemented lens, sixth and seventh lens components are both positive meniscus lenses. Besides, the lens system according to the present invention is arranged to satisfy the following conditions.

1. $f_{1234} < 0$

2. $59 > \nu_1 > 45$, $45 > \nu_2 > 30$

3. $63 > \nu_3 > 45$, $30 > \nu_4 > 20$

In the above, reference symbol $f_{1234}$ represents the total focal length of the first fourth lens components, reference symbols $\nu_1$, $\nu_2$, $\nu_3$ and $\nu_4$ respectively represent Abbe's numbers of the first through fourth lens components.

In the lens system arranged as above, the condition (1), i.e., the fact that the total focal length $f_{1234}$ of the front lens group comprising the first through fourth lens components in front of the stop is made a negative value is one of characteristics of the present invention, and the lens system according to the present invention has an arrangement which is quite different from that of conventional retrofocus type wide-angle lens systems, most of which are arranged to have the total focal length of a positive value for the front lens group. This condition contributes to compact arrangement of the lens system. That is, this condition is effective to eliminate the disadvantage of the conventional super-wide-angle lens that the diameter of the front lens becomes large and is also effective to make the overall length of the lens system small. Besides, this condition enables to apply the new correcting means for chromatic aberration which is the important characteristic of the present invention as described in the above. When the total focal length $f_{1234}$ of the front lens group is a negative value, the image focused by the front lens group is imaged by the rear lens group by a negative magnification. When $f_{1234}$ is a positive value, said image focused by the front lens group is imaged by the rear lens group by a positive magnification. As, however, the rear lens group has a focal length of a positive value, lateral chromatic aberration cannot be corrected favourably unless the image focused by the front lens group is arranged so that the image by the g-line is larger than the image by the d-line. Besides, as described in the above, the direction of the image becomes opposite depending on the fact that the total focal length of the front lens group is a positive value or negative value. Therefore, the correcting means for lateral chromatic aberration has to be also opposite. That is, in the lens system according to the present invention, lenses are arranged to have Abbe's numbers as shown in the condition (2) which is a correcting means quite opposite to the conventional correcting means. If the condition (2) is not satisfied, lateral chromatic aberration cannot be corrected favourably. However, if the condition (2) is applied to old type of retrofocus type wide-angle lenses which have a large airspace between the negative lens of the front lens group and lens of the rear lens group and the airspace between the first positive lens component and second negative lens component is comparatively large, it is not effective because unfavourable correction of aberrations will be caused. Therefore, this condition can be applied only for lens systems having arrangement like the lens system according to the present invention for which especially the airspace between the first positive lens component and second negative lens component is of extremely small. Besides, in the lens system according to the present invention, heights of principal ray at the first and second lens components are larger than those at the third and fourth lens components. Therefore, by adopting the correcting means for chromatic aberrations as shown by conditions (1) and (2) in the above, it is possible to favourably correct lateral chromatic aberration especially in the marginal portion of the field. Besides, for the third and fourth lens components, it is necessary to select Abbe's numbers to satisfy the condition (3). If the condition (3) is not satisfied, correction of lateral chromatic aberration will become unfavourable.

As explained in the above, lens systems which satisfy the afore-mentioned conditions are favourable lens systems by which it is possible to attain the object of the present invention. When, however, Abbe's numbers are selected within the ranges defined by the following conditions, the present invention provides more favourable lens systems.

2'. $58 > \nu_1 > 45$   $45 > \nu_2 > 33$

3'. $61 > \nu_3 > 45$   $28 > \nu_4 > 25$

BRIEF DESCRIPTION OF THE DRAWINGS

FIGS. 3A – 3D and
FIGS. 4A – 4D respectively show graphs illustrating aberration curves of said first and second embodiments.

DETAILED DESCRIPTION OF THE PREFERRED EMBODIMENTS

Figure 1:
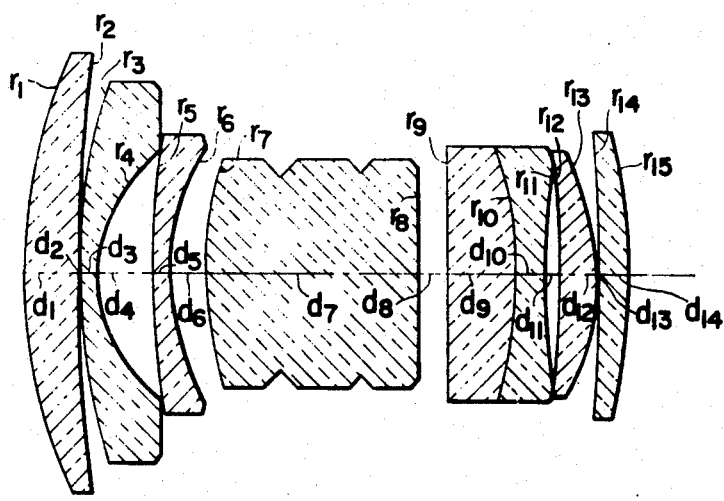
FIG. 1 shows sectional view of embodiment 1.
Figure 2:
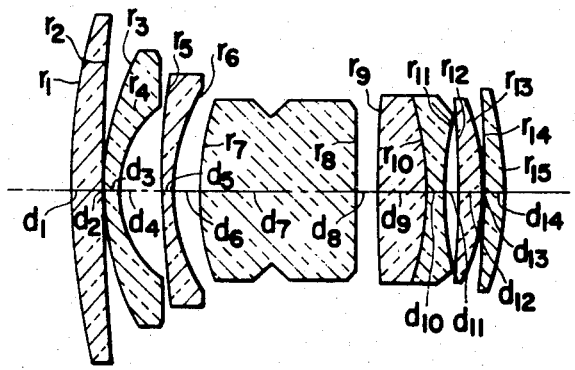
FIG. 2 shows sectional view of embodiments 2 through 5.

Preferred embodiments of the lens system according to the present invention as described in the above are lens systems arranged as illustrated in FIG. 1 and FIG. 2. Examples of numerical data for said embodiments are as given below.

Embodiment 1
$r_1 = 1.1709$
　　　$d_1 = 0.1294$　　$n_1 = 1.6968$　　$\nu_1 = 55.6$
$r_2 = 3.8797$
　　　$d_2 = 0.0039$
$r_3 = 1.4791$
　　　$d_3 = 0.0388$　　$n_2 = 1.6129$　　$\nu_2 = 37.0$
$r_4 = 0.3523$
　　　$d_4 = 0.1321$
$r_5 = 1.7185$
　　　$d_5 = 0.0388$　　$n_3 = 1.6385$　　$\nu_3 = 55.4$
$r_6 = 0.5719$
　　　$d_6 = 0.0859$
$r_7 = 0.7735$
　　　$d_7 = 0.3460$　　$n_4 = 1.8052$　　$\nu_4 = 25.4$
$r_8 = \infty$
　　　$d_8 = 0.0652$
$r_9 = \infty$
　　　$d_9 = 0.1685$　　$n_5 = 1.7292$　　$\nu_5 = 54.7$
$r_{10} = -0.8416$
　　　$d_{10} = 0.0688$　　$n_6 = 1.8052$　　$\nu_6 = 25.4$
$r_{11} = 2.2341$
　　　$d_{11} = 0.0311$
$r_{12} = -2.8951$
　　　$d_{12} = 0.0826$　　$n_7 = 1.6968$　　$\nu_7 = 55.6$
$r_{13} = -0.6002$
　　　$d_{13} = 0.0039$
$r_{14} = -6.8742$
　　　$d_{14} = 0.0754$　　$n_8 = 1.6968$　　$\nu_8 = 55.6$
$r_{15} = -1.3240$
$f = 1.0,$　　$f_B = 1.4446;$　　$f_{1234} = -2.806$ Embodiment 2
$r_1 = 2.0484$
　　　$d_1 = 0.1225$　　$n_1 = 1.6968$　　$\nu_1 = 55.6$
$r_2 = 6.1367$
　　　$d_2 = 0.0041$
$r_3 = 0.9831$
　　　$d_3 = 0.0408$　　$n_2 = 1.6129$　　$\nu_2 = 37.0$
$r_4 = 0.3756$
　　　$d_4 = 0.1487$
$r_5 = 2.1516$
　　　$d_5 = 0.0408$　　$n_3 = 1.6385$　　$\nu_3 = 55.4$
$r_6 = 0.5900$
　　　$d_6 = 0.0968$
$r_7 = 0.8522$
　　　$d_7 = 0.5513$　　$n_4 = 1.8052$　　$\nu_4 = 25.4$
$r_8 = 16.8323$
　　　$d_8 = 0.0796$
$r_9 = 5.0069$
　　　$d_9 = 0.1776$　　$n_5 = 1.7292$　　$\nu_5 = 54.7$
$r_{10} = -0.9993$
　　　$d_{10} = 0.0694$　　$n_6 = 1.8052$　　$\nu_6 = 25.4$
$r_{11} = 2.1113$
　　　$d_{11} = 0.0408$
$r_{12} = -2.3655$
　　　$d_{12} = 0.0817$　　$n_7 = 1.6968$　　$\nu_7 = 55.6$
$r_{13} = -0.7024$
　　　$d_{13} = 0.0041$
$r_{14} = -4.7040$
　　　$d_{14} = 0.0784$　　$n_8 = 1.6968$　　$\nu_8 = 55.6$
$r_{15} = -1.0036$
$f = 1.0,$　　$f_B = 1.5313,$　　$f_{1234} = -2.115$ Embodiment 3
$r_1 = 1.8977$
　　　$d_1 = 0.1225$　　$n_1 = 1.6779$　　$\nu_1 = 50.7$
$r_2 = 5.2068$
　　　$d_2 = 0.0041$
$r_3 = 0.7366$
　　　$d_3 = 0.0408$　　$n_2 = 1.64769$　　$\nu_2 = 33.8$
$r_4 = 0.3791$
　　　$d_4 = 0.1715$
$r_5 = 3.9624$
　　　$d_5 = 0.0408$　　$n_3 = 1.64$　　$\nu_3 = 60.3$
$r_6 = 0.5257$
　　　$d_6 = 0.0978$
$r_7 = 0.8522$
　　　$d_7 = 0.5321$　　$n_4 = 1.80518$　　$\nu_4 = 25.4$
$r_8 = 9.0447$
　　　$d_8 = 0.0821$
$r_9 = 1.8847$
　　　$d_9 = 0.1931$　　$n_5 = 1.6935$　　$\nu_5 = 53.3$
$r_{10} = -0.9666$
　　　$d_{10} = 0.0408$　　$n_6 = 1.80518$　　$\nu_6 = 25.4$
$r_{11} = 1.7802$
　　　$d_{11} = 0.0584$
$r_{12} = -1.5388$
　　　$d_{12} = 0.0898$　　$n_7 = 1.6779$　　$\nu_7 = 53.4$
$r_{13} = -0.6182$
　　　$d_{13} = 0.0041$
$r_{14} = -37.9867$
　　　$d_{14} = 0.0825$　　$n_8 = 1.6779$　　$\nu_8 = 53.4$
$r_{15} = -1.1989$
$f = 1.0$　　$f_B = 1.5503$　　$f_{1234} = -1.6198$ Embodiment 4
$r_1 = 1.9159$
　　　$d_1 = 0.1224$　　$n_1 = 1.6779$　　$\nu_1 = 50.7$
$r_2 = 5.2732$
　　　$d_2 = 0.0041$
$r_3 = 0.7263$
　　　$d_3 = 0.0408$　　$n_2 = 1.65016$　　$\nu_2 = 39.4$
$r_4 = 0.3793$
　　　$d_4 = 0.1714$
$r_5 = 3.9613$
　　　$d_5 = 0.0408$　　$n_3 = 1.64328$　　$\nu_3 = 47.9$
$r_6 = 0.5219$
　　　$d_6 = 0.0973$
$r_7 = 0.8505$
　　　$d_7 = 0.5308$　　$n_4 = 1.80518$　　$\nu_4 = 25.4$
$r_8 = 10.3139$
　　　$d_8 = 0.0820$
$r_9 = 1.9531$
　　　$d_9 = 0.1930$　　$n_5 = 1.6935$　　$\nu_5 = 53.3$
$r_{10} = -1.0077$
　　　$d_{10} = 0.0408$　　$n_6 = 1.80518$　　$\nu_6 = 25.4$
$r_{11} = 1.7984$
　　　$d_{11} = 0.0584$
$r_{12} = -1.5089$
　　　$d_{12} = 0.0898$　　$n_7 = 1.6779$　　$\nu_7 = 53.4$
$r_{13} = -0.6176$
　　　$d_{13} = 0.0041$
$r_{14} = -33.8252$
　　　$d_{14} = 0.0824$　　$n_8 = 1.6779$　　$\nu_8 = 53.4$
$r_{15} = -1.1853$
$f = 1.0$　　$f_B = 1.5494$　　$f_{1234} = -1.6490$ Embodiment 5
$r_1 = 1.7666$
　　　$d_1 = 0.1224$　　$n_1 = 1.67003$　　$\nu_1 = 47.3$
$r_2 = 4.9516$
　　　$d_2 = 0.0041$
$r_3 = 0.7273$
　　　$d_3 = 0.0408$　　$n_2 = 1.6393$　　$\nu_2 = 44.9$
$r_4 = 0.3746$
　　　$d_4 = 0.1714$
$r_5 = 3.9617$
　　　$d_5 = 0.0408$　　$n_3 = 1.64328$　　$\nu_3 = 47.9$
$r_6 = 0.5111$
　　　$d_6 = 0.0984$ -continued

| | | | |
|---|---|---|---|
| $r_7 = 0.7896$ | $d_7 = 0.5274$ | $n_4 = 1.7552$ | $\nu_4 = 27.5$ |
| $r_8 = 8.2189$ | $d_8 = 0.0820$ | | |
| $r_9 = 2.0074$ | $d_9 = 0.1896$ | $n_5 = 1.6935$ | $\nu_5 = 53.5$ |
| $r_{10} = -1.0429$ | $d_{10} = 0.0408$ | $n_6 = 1.80518$ | $\nu_6 = 25.4$ |
| $r_{11} = 1.8390$ | $d_{11} = 0.0584$ | | |
| $r_{12} = -1.4726$ | $d_{12} = 0.0898$ | $n_7 = 1.6779$ | $\nu_7 = 53.4$ |
| $r_{13} = -0.6347$ | $d_{13} = 0.0041$ | | |
| $r_{14} = 45.0332$ | $d_{14} = 0.0824$ | $n_8 = 1.6779$ | $\nu_8 = 53.4$ |
| $r_{15} = -1.1716$ | | | |
| $f = 1.0$ | $f_B = 1.5599$ | $f_{1234} = -1.5999$ | |

In the above, reference symbols $r_1$ through $r_{15}$ respectively represent radii of curvature of respective surfaces of lenses, reference symbols $d_1$ through $d_{14}$ respectively represent thicknesses of respective lenses and airspaces between lenses, reference symbols $n_1$ through $n_8$ respectively represent refractive indexes of respective lenses, $\nu_1$ through $\nu_8$ respectively represent Abbe's numbers of respective lenses, reference symbol $f$ represents the total focal length of the lens system as a whole, reference symbol $f_B$ represents the back focal length and reference symbol $f_{1234}$ represents the total focal length of the front lens group, i.e., first through fourth lens components.

The embodiment 1 is for the lens system shown in FIG. 1 and curves showing conditions of various aberrations of the embodiment 1 are shown in FIGS. 3A – 3D. The embodiment 2 is the lens system shown in FIG. 2 and curves showing conditions of various aberrations of the embodiment 2 are shown in FIGS. 4A – 4D. The embodiment 3 through 5 are for the lens system shown in FIG. 2.

I claim:

1. A wide-angle photographic lens system comprising seven lens components wherein a first lens component being a positive meniscus lens, a second and third lens components being negative meniscus lenses, a fourth lens component being a positive lens, a fifth lens component being a cemented negative lens, and a sixth and seventh lens components being positive meniscus lenses, and said wide-angle photographic lens system satisfying the following conditions:

1. $f_{1234} < 0$

2. $59 > \nu_1 > 45$, $45 > \nu_2 > 30$

3. $63 > \nu_3 > 45$, $30 > \nu_4 > 20$ where reference symbol $f_{1234}$ represents a total focal length of the first, second, third and fourth lens components, reference symbols $\nu_1$, $\nu_2$, $\nu_3$ and $\nu_4$ respectively represent Abbe's numbers of the first, second, third and fourth lens components.

2. A wide-angle photographic lens system comprising seven lens components wherein a first lens component being a positive meniscus lens, a second and third lens component being negative meniscus lenses, a fourth lens component being a positive lens, a fifth lens component being a cemented negative lens, and a sixth and seventh lens components being positive meniscus lenses, and said wide-angle photographic lens system having the following numerical data:

| | | | |
|---|---|---|---|
| $r_1 = 1.709$ | $d_1 = 0.1294$ | $n_1 = 1.6968$ | $\nu_1 = 55.6$ |
| $r_2 = 3.8797$ | $d_2 = 0.0039$ | | |
| $r_3 = 1.4791$ | $d_3 = 0.0388$ | $n_2 = 1.6129$ | $\nu_2 = 37.0$ |
| $r_4 = 0.3523$ | $d_4 = 0.1321$ | | |
| $r_5 = 1.7185$ | $d_5 = 0.0388$ | $n_3 = 1.6385$ | $\nu_3 = 55.4$ |
| $r_6 = 0.5719$ | $d_6 = 0.0859$ | | |
| $r_7 = 0.7735$ | $d_7 = 0.3460$ | $n_4 = 1.8052$ | $\nu_4 = 25.4$ |
| $r_8 = \infty$ | $d_8 = 0.0652$ | | |
| $r_9 = \infty$ | $d_9 = 0.1685$ | $n_5 = 1.7292$ | $\nu_5 = 54.7$ |
| $r_{10} = -0.8416$ | $d_{10} = 0.0688$ | $n_6 = 1.8052$ | $\nu_6 = 25.4$ |
| $r_{11} = 2.2341$ | $d_{11} = 0.0311$ | | |
| $r_{12} = -2.8951$ | $d_{12} = 0.0826$ | $n_7 = 1.6968$ | $\nu_7 = 55.6$ |
| $r_{13} = -0.6002$ | $d_{13} = 0.0039$ | | |
| $r_{14} = -6.8742$ | $d_{14} = 0.0754$ | $n_8 = 1.6968$ | $\nu_8 = 55.6$ |
| $r_{15} = -1.3240$ | | | |
| $f = 1.0$, | $f_B = 1.4446$, | $f_{1234} = -2.806$ | | where reference symbols $r_1$ through $r_{15}$ respectively represent radii of curvature of respective surfaces of lenses, reference symbols $d_1$ through $d_{14}$ respectively represent thicknesses of respective lenses and airspaces between lenses, reference symbols $n_1$ through $n_8$ respectively represent refractive indexes of respective lenses, $\nu_1$ through $\nu_8$ respectively represent Abbe's numbers of respective lenses, reference symbol $f$ represents the total focal length of the lens system as a whole, reference symbol $f_B$ represents the back focal length and reference symbol $f_{1234}$ represents the total focal length of the front lens group, i.e., first through fourth lens components.

3. A wide-angle photographic lens system comprising seven lens components wherein a first lens component being a positive meniscus lens, a second and third lens components being negative meniscus lenses, a fourth lens component being a positive lens, a fifth lens component being a cemented negative lens, and a sixth and seventh lens components being positive meniscus lenses, and said wide-angle photographic lens system having the following numerical data;

| | | | |
|---|---|---|---|
| $r_1 = 2.0484$ | $d_1 = 0.1225$ | $n_1 = 1.6968$ | $\nu_1 = 55.6$ |
| $r_2 = 6.1367$ | $d_2 = 0.0041$ | | |
| $r_3 = 0.9831$ | $d_3 = 0.0408$ | $n_2 = 1.6129$ | $\nu_2 = 37.0$ |
| $r_4 = 0.3756$ | $d_4 = 0.1487$ | | |
| $r_5 = 2.1516$ | $d_5 = 0.0408$ | $n_3 = 1.6385$ | $\nu_3 = 55.4$ |
| $r_6 = 0.5900$ | $d_6 = 0.0968$ | | |
| $r_7 = 0.8522$ | $d_7 = 0.5513$ | $n_4 = 1.8052$ | $\nu_4 = 25.4$ |
| $r_8 = 16.8323$ | $d_8 = 0.0796$ | | |
| $r_9 = 5.0069$ | $d_9 = 0.1776$ | $n_5 = 1.7292$ | $\nu_5 = 54.7$ |
| $r_{10} = -0.9993$ | $d_{10} = 0.0694$ | $n_6 = 1.8052$ | $\nu_6 = 25.4$ |
| $r_{11} = 2.1113$ | $d_{11} = 0.0408$ | | |
| $r_{12} = -2.3655$ | $d_{12} = 0.0817$ | $n_7 = 1.6968$ | $\nu_7 = 55.6$ |
| $r_{13} = 0.7024$ | $d_{13} = 0.0041$ | | |

-continued $r_{14} = -4.7040$
 $d_{14} = 0.0784$  $n_8 = 1.6968$  $\nu_8 = 55.6$
$r_{15} = -1.0036$
 $f = 1.0$,  $f_B = 1.5313$,  $f_{1234} = -2.115$ where reference symbols $r_1$ through $r_{15}$ respectively represent radii of curvature of respective surfaces of lenses, reference symbols $d_1$ through $d_{14}$ respectively represent thicknesses of respective lenses and airspaces between lenses, reference symbols $n_1$ through $n_8$ respectively represent refractive indexes of respective lenses, $\nu_1$ through $\nu_8$ respectively represent Abbe's numbers of respective lenses, reference symbol $f$ represents the total focal length of the lens system as a whole, reference symbol $f_B$ represents the back focal length and reference symbol $f_{1234}$ represents the total focal length of the front lens group, i.e., first through fourth lens components.

4. A wide-angle photographic lens system comprising seven lens components wherein a first lens component being a positive meniscus lens, a second and third lens components being negative meniscus lenses, a fourth lens component being a positive lens, a fifth lens component being a cemented negative lens, and a sixth and seventh lens components being positive meniscus lenses, and said wide-angle photographic lens system having the following numerical data;

Table $r_1 = 1.8977$
 $d_1 = 0.1225$  $n_1 = 1.6779$  $\nu_1 = 50.7$
$r_2 = 5.2068$
 $d_2 = 0.0041$
$r_3\ 12 = 0.7366$
 $d_3 = 0.0408$  $n_2 = 1.64769$  $\nu_2 = 33.8$
$r_4 = 0.3791$
 $d_4 = 0.1715$
$r_5 = 3.9624$
 $d_5 = 0.0408$  $n_3 = 1.64$  $\nu_3 = 60.3$
$r_6 = 0.5257$
 $d_6 = 0.0978$
$r_7 = 0.8522$
 $d_7 = 0.5321$  $n_4 = 1.80518$  $\nu_4 = 25.4$
$r_8 = 9.0447$
 $d_8 = 0.0821$
$r_9 = 1.8847$
 $d_9 = 0.1931$  $n_5 = 1.6935$  $\nu_5 = 53.3$
$r_{10} = -0.9666$
 $d_{10} = 0.0408$  $n_6 = 1.80518$  $\nu_6 = 25.4$
$r_{11} = 1.7802$
 $d_{11} = 0.0584$
$r_{12} = -1.5388$
 $d_{12} = 0.0898$  $n_7 = 1.6779$  $\nu_7 = 53.4$
$r_{13} = 0.6182$
 $d_{13} = 0.0041$
$r_{14} = -37.9867$
 $d_{14} = 0.0825$  $n_8 = 1.6779$  $\nu_8 = 53.4$
$r_{15} = -1.1989$
 $f = 1.0$  $f_B = 1.5503$  $f_{1234} = -1.6198$.

5. A wide-angle photographic lens system comprising seven lens components wherein a first lens component being a positive meniscus lens, a second and third lens components being negative meniscus lenses, a fourth lens component being a positive lens, a fifth lens component being a cemented negative lens, and a sixth and seventh lens components being positive meniscus lenses, and said wide-angle photographic lens system having the following numerical data;

Table $r_1 = 1.9159$
 $d_1 = 0.1224$  $n_1 = 1.6779$  $\nu_1 = 50.7$
$r_2 = 5.2732$
 $d_2 = 0.0041$
$r_3 = 0.7263$
 $d_3 = 0.0408$  $n_2 = 1.65016$  $\nu_2 = 39.4$
$r_4 = 0.3793$
 $d_4 = 0.1714$
$r_5 = 3.9613$
 $d_5 = 0.0408$  $n_3 = 1.64328$  $\nu_3 = 47.9$
$r_6 = 0.5219$
 $d_6 = 0.0973$
$r_7 = 0.8505$
 $d_7 = 0.5308$  $n_4 = 1.80518$  $\nu_4 = 25.4$
$r_8 = 10.3139$
 $d_8 = 0.0820$
$r_9 = 1.9531$
 $d_9 = 0.1930$  $n_5 = 1.6935$  $\nu_5 = 53.3$
$r_{10} = -1.0077$
 $d_{10} = 0.0408$  $n_6 = 1.80518$  $\nu_6 = 25.4$
$r_{11} = 1.7984$
 $d_{11} = 0.0584$
$r_{12} = -1.5089$
 $d_{12} = 0.0898$  $n_7 = 1.6779$  $\nu_7 = 53.4$
$r_{13} = -0.6176$
 $d_{13} = 0.0041$
$r_{14} = -33.8252$
 $d_{14} = 0.0824$  $n_8 = 1.6779$  $\nu_8 = 53.4$
$r_{15} = -1.1853$
 $f = 1.0$  $f_B = 1.5494$  $f_{1234} = -1.6490$.

6. A wide-angle photographic lens system comprising seven lens components wherein a first lens component being a positive meniscus lens, a second and third lens components being negative meniscus lenses, a fourth lens component being a positive lens, a fifth lens component being a cemented negative lens, and a sixth and seventh lens components being positive meniscus lenses, and said wide-angle photographic lens system having the following numerical data;

Table $r_1 = 1.7666$
 $d_1 = 0.1224$  $n_1 = 1.67003$  $\nu_1 = 47.3$
$r_2 = 4.9516$
 $d_2 = 0.0041$
$r_3 = 0.7273$
 $d_3 = 0.0408$  $n_2 = 1.6393$  $\nu_2 = 44.9$
$r_4 = 0.3746$
 $d_4 = 0.1714$
$r_5 = 3.9617$
 $d_5 = 0.0408$  $n_3 = 1.64327$  $\nu_3 = 47.9$
$r_6 = 0.5111$
 $d_6 = 0.0984$
$r_7 = 0.7896$
 $d_7 = 0.5274$  $n_4 = 1.7552$  $\nu_4 = 27.5$
$r_8 = 8.2189$
 $d_8 = 0.0820$
$r_9 = 2.0074$
 $d_9 = 0.1896$  $n_5 = 1.6935$  $\nu_5 = 53.3$
$r_{10} = -1.0429$
 $d_{10} = 0.0408$  $n_6 = 1.80518$  $\nu_6 = 25.4$
$r_{11} = 1.8390$
 $d_{11} = 0.0584$
$r_{12} = -1.4726$
 $d_{12} = 0.0898$  $n_7 = 1.6779$  $\nu_7 = 53.4$
$r_{13} = -0.6347$
 $d_{13} = 0.0041$
$r_{14} = 45.0332$
 $d_{14} = 0.0824$  $n_8 = 1.6779$  $\nu_8 = 53.4$
$r_{15} = -1.1716$
 $f = 1.0$  $f_B = 1.5599$  $f_{1234} = -1.5999$.

\* \* \* \* \*